(12) United States Patent
Shiga et al.

(10) Patent No.: US 10,850,214 B2
(45) Date of Patent: Dec. 1, 2020

(54) INCLINED SEDIMENTATION ACCELERATION APPARATUS

(71) Applicants: METAWATER CO., LTD., Tokyo (JP); ACE WATER CO., LTD., Fukuoka (JP)

(72) Inventors: Junichi Shiga, Tokyo (JP); Toshiyuki Kitada, Fukuoka (JP); Takahito Sugimoto, Tokyo (JP); Dabide Yamaguchi, Tokyo (JP)

(73) Assignees: METAWATER CO., LTD., Tokyo (JP); ACE WATER CO., LTD., Fukuoka (JP)

(*) Notice: Subject to any disclaimer, the term of this patent is extended or adjusted under 35 U.S.C. 154(b) by 0 days.

(21) Appl. No.: 16/139,376

(22) Filed: Sep. 24, 2018

(65) Prior Publication Data

US 2019/0022561 A1    Jan. 24, 2019

Related U.S. Application Data

(63) Continuation of application No. PCT/JP2017/004284, filed on Feb. 6, 2017.

(30) Foreign Application Priority Data

Mar. 29, 2016    (JP) .................................. 2016-066873

(51) Int. Cl.
*B01D 21/02* (2006.01)
*B01D 21/00* (2006.01)

(52) U.S. Cl.
CPC ..... *B01D 21/0042* (2013.01); *B01D 21/0003* (2013.01); *B01D 21/0045* (2013.01);
(Continued)

(58) Field of Classification Search
CPC ............ B01D 21/0042; B01D 21/0045; B01D 21/0051; B01D 21/0057
(Continued)

(56) References Cited

U.S. PATENT DOCUMENTS 1,190,863 A * 7/1916 Corne ................ B01D 21/0045
210/521
3,706,384 A    12/1972 Weijman-Hane
(Continued)

FOREIGN PATENT DOCUMENTS

DE    43 02 003 A1    8/1994
FR    2 273 571 A2    1/1976
(Continued)

OTHER PUBLICATIONS

Extended European Search Report (Application No. 17773674.1) dated Oct. 15, 2019.
(Continued)

*Primary Examiner* — Christopher Upton
(74) *Attorney, Agent, or Firm* — Burr & Brown, PLLC

(57) ABSTRACT

An inclined sedimentation acceleration apparatus includes an inclined part having a plurality of inclined flow paths through which raw water flows, and side plates disposed on both sides of the inclined part. An upper ridge part of the inclined part is disposed at a height different from that of an upper ridge part of the side plate. Suspended solids are less likely to accumulate on an upper surface of the inclined sedimentation acceleration apparatus.

17 Claims, 10 Drawing Sheets

(52) U.S. Cl.
CPC ..... *B01D 21/0051* (2013.01); *B01D 21/0057* (2013.01); *B01D 21/0069* (2013.01); *B01D 21/02* (2013.01)

(58) Field of Classification Search
USPC ........................................ 210/521, 522, 802
See application file for complete search history.

(56) References Cited

U.S. PATENT DOCUMENTS

| | | | | |
|---|---|---|---|---|
| 3,886,064 | A * | 5/1975 | Kosonen | B01D 21/0045 |
| | | | | 210/522 |
| 4,089,782 | A * | 5/1978 | Huebner | B01D 21/0045 |
| | | | | 210/522 |
| 4,793,926 | A | 12/1988 | Vion | |
| 5,217,614 | A | 6/1993 | Meurer | |
| 2006/0175251 | A1* | 8/2006 | Roberts | B01D 21/0051 |
| | | | | 210/521 |
| 2013/0037494 | A1* | 2/2013 | Cook | B01D 21/0045 |
| | | | | 210/521 |

FOREIGN PATENT DOCUMENTS

| | | |
|---|---|---|
| FR | 2 483 799 A1 | 12/1981 |
| JP | S52-062569 U | 5/1977 |
| JP | S54-048954 A1 | 4/1979 |
| JP | S55-095830 U | 7/1980 |
| JP | H05-200205 A1 | 8/1993 |
| JP | 2004-105859 A1 | 4/2004 |
| JP | 2009-029987 A1 | 2/2009 |
| JP | 2009-045532 A1 | 3/2009 |
| JP | 2009-061407 A1 | 3/2009 |
| JP | 2010-264409 A1 | 11/2010 |
| WO | 2009/114206 A2 | 9/2009 |

OTHER PUBLICATIONS

Japanese Office Action (Application No. 2016-066873) dated Sep. 3, 2019 (with English translation).
International Search Report and Written Opinion (Application No. PCT/JP2017/004284) dated Mar. 7, 2017.

* cited by examiner

PRIOR ART

PRIOR ART

PRIOR ART ly, a sedimentation pond is provided in a water treatment facility that treats water to be treated (raw water) taken from, for example, a river. In the sedimentation pond, there is installed an inclined sedimentation acceleration apparatus (hereinafter referred to as "sedimentation apparatus" in some cases) for treating raw water (see Patent Documents 1 to 3).

INCLINED SEDIMENTATION ACCELERATION APPARATUS

BACKGROUND OF THE INVENTION

Field of the Invention

The present invention relates to an inclined sedimentation acceleration apparatus. More specifically, the present invention relates to an inclined sedimentation acceleration apparatus for obtaining treated water by precipitating suspended solids (SS) from raw water.

Background Art

Conventionally, a sedimentation pond is provided in a water treatment facility that treats water to be treated (raw water) taken from, for example, a river. In the sedimentation pond, there is installed an inclined sedimentation acceleration apparatus (hereinafter referred to as "sedimentation apparatus" in some cases) for treating raw water (see Patent Documents 1 to 3).

CITATION LIST

Patent Documents

[Patent Document 1] JP-A-2009-45532
[Patent Document 2] JP-A-2009-29987
[Patent Document 3] JP-A-H5-200205

SUMMARY OF THE INVENTION

Problem to be Solved by the Invention

By means of a sedimentation apparatus, it is possible to perform water treatment by precipitating suspended solids contained in raw water in a favorable manner. However, since the conventional sedimentation apparatus, as described in Patent Documents 1 to 3, has a structure in which suspended solids easily accumulate on the upper surface of the apparatus, the following problems arise.

(1) Deposits of suspended solids block a flow path of the sedimentation apparatus, and deteriorate removal performance of the sedimentation apparatus. (2) Deposits having peeled off from the sedimentation apparatus are mixed into treated water, and deteriorate the quality of treated water. (3) Deposits breed chironomids, algae, and others. (4) In order to prevent excessive accumulation of suspended solids, the sedimentation apparatus needs to be cleaned regularly.

The present invention has been made in view of such problems of the prior art, and provides an inclined sedimentation acceleration apparatus capable of preventing accumulation of suspended solids on the upper surface of the apparatus.

Means for Solving the Problem

According to the present invention, there is provided an inclined sedimentation acceleration apparatus as described below.

[1] An inclined sedimentation acceleration apparatus including: an inclined part having a plurality of inclined flow paths through which raw water flows; and side plates disposed on both sides of the inclined part, wherein an upper ridge part of the inclined part is disposed at a height different from that of an upper ridge part of the side plate.

[2] The inclined sedimentation acceleration apparatus according to the item [1] above, wherein the upper ridge part of the inclined part is disposed at a position lower than that of the upper ridge part of the side plate.

[3] The inclined sedimentation acceleration apparatus according to the item [1] or [2] above, wherein the inclined part is formed of an inclined plate or a rectangular cylindrical member.

[4] The inclined sedimentation acceleration apparatus according to the item [1] or [2] above, including a plurality of the inclined parts arranged in parallel, wherein the adjacent inclined parts having the side plate interposed therebetween are arranged in a manner to be displaced from each other along a longitudinal direction of the side plate.

[5] An inclined sedimentation acceleration apparatus including: a plurality of inclined parts arranged in parallel, the inclined part having a plurality of inclined flow paths through which raw water flows; and side plates disposed on both sides of the inclined part, wherein the adjacent inclined parts having the side plate interposed therebetween are arranged in a manner to be displaced from each other along a longitudinal direction of the side plate.

Effect of the Invention

According to the inclined sedimentation acceleration apparatus of the present invention, it is possible to effectively prevent accumulation of suspended solids on the upper surface of the apparatus. As a result, blockage of the flow path of the apparatus is unlikely to occur, and removal performance of the apparatus can be well maintained. In addition, labor for cleaning the apparatus can be saved or reduced.

DETAILED DESCRIPTION OF THE INVENTION

Embodiments of the present invention will be described below. The present invention is not limited to the following embodiments. It should be understood that the following embodiments with alterations, modifications, and the like added thereto, as appropriate, based on ordinary knowledge of those skilled in the art without departing from the spirit of the present invention, are also included in the scope of the present invention.

Figure 21:
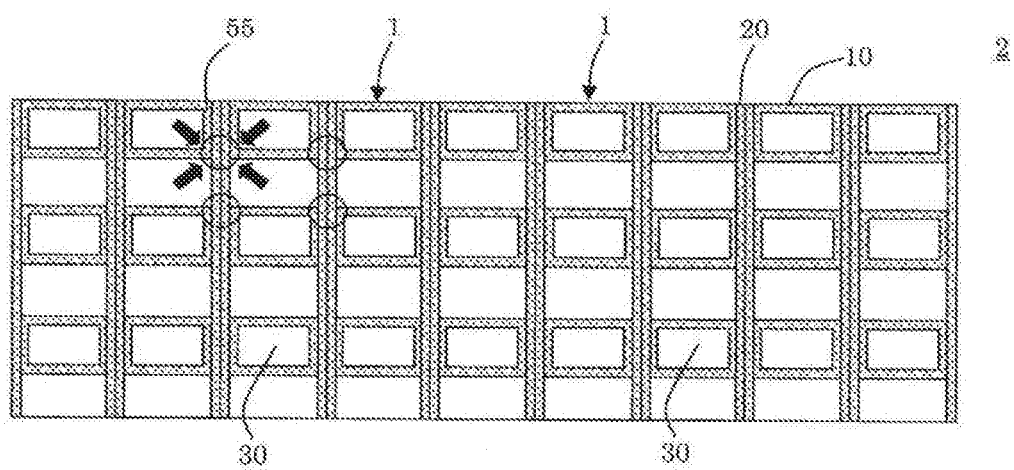
FIG. 21 is a plane view schematically showing the conventional inclined sedimentation acceleration apparatus as seen from an upper ridge part side.

First, the present inventors' new findings regarding the problems of the prior art will be described. The present inventors have examined the above-described problems of the prior art from various viewpoints. In a conventional sedimentation apparatus 1, as shown in FIG. 21, upper ridge parts of side plates 20 and upper ridge parts of inclined parts 10 are positioned on the same plane. In addition, the side plates 20 and the inclined parts 10 intersect in a cross shape. The present inventors have thus found that due to this configuration, the following phenomenon occurs in the conventional sedimentation apparatus 1. In other words, the present inventors have found that the following phenomenon occurs due to the fact that an intersection of the side plates 20 and the inclined parts 10 is surrounded by four flow paths (inclined flow paths) 30. That is, it has been found that in the conventional sedimentation apparatus 1, suspended solids tend to accumulate at the intersection of the side plates 20 and the inclined parts 10 (for example, areas surrounded by circles in FIG. 21), and that there occurs growth of deposits 55 of the suspended solids, originating from the intersection.

It should be noted that hereinafter, the "inclined flow path" will be simply referred to as "flow path" in some cases.

The above-described phenomenon will be described in more detail with reference to the drawings. FIGS. 18 to 21 are drawings schematically showing a conventional inclined sedimentation acceleration apparatus. It should be noted that a conventional sedimentation apparatus 2 includes a plurality of the sedimentation apparatuses 1 shown in FIG. 18, which are arranged in parallel. The sedimentation apparatus 1 shown in FIG. 18 includes the inclined part 10 and the side plates 20, and upper ridge parts 21 of the side plates 20 and upper ridge parts 15 of the inclined part 10 are positioned on the same plane.

Figure 20:
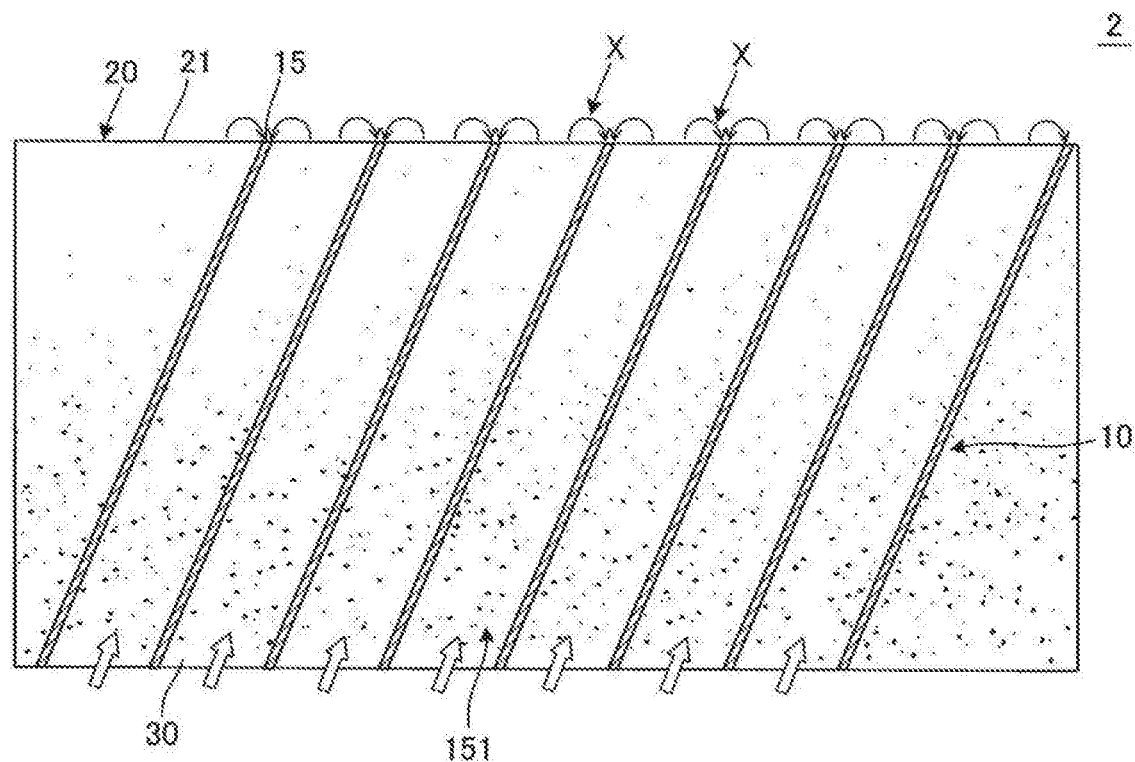
FIG. 20 is a sectional view schematically showing the conventional inclined sedimentation acceleration apparatus as seen from the side plate side.

In the sedimentation apparatus 2, raw water 151 is supplied from a lower end face of the sedimentation apparatus 2 to a flow path 30, and flows out, as treated water, from an upper end face. At this time, most of the discharged treated water is collected by a water collecting trough disposed above. Then, it is considered that a part of the treated water generates a downward flow X as shown in FIG. 20. When, as in the sedimentation apparatus 2, the upper ridge parts 15 of the inclined parts 10 and the upper ridge parts 21 of the side plates 20 intersect at the same level (that is, the upper ridge parts 21 of the side plates 20 and the upper ridge parts 15 of the inclined parts 10 intersect on the same plane), the downward flows X from the four flow paths (that is, four directions (all directions)) gather at each intersection as indicated by arrows in FIG. 21. At this time, suspended solids floating in the flow path 30 in the vicinity of an outlet thereof are caught in the downward flow X, and land at the intersection. Other suspended solids caught in the downward flow X are then caught by the suspended solids that have landed, and thus an accumulation gradually increases. Therefore, it is considered that suspended solids tend to accumulate and generate the deposits 55 at the intersections of the conventional sedimentation apparatus 2.

Figure 19:
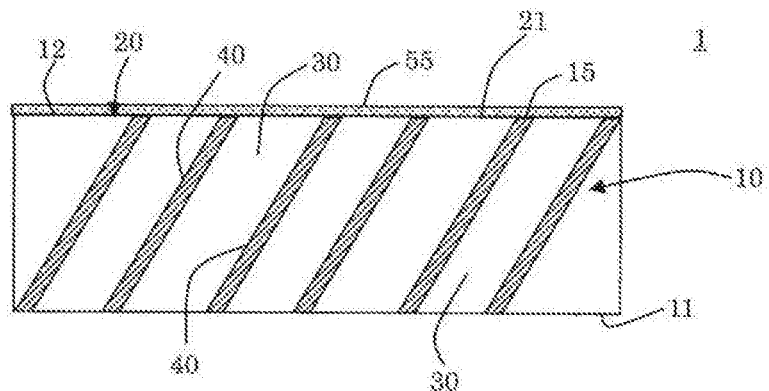
FIG. 19 is a sectional view schematically showing the conventional inclined sedimentation acceleration apparatus as seen from a side plate side.

As described above, since each intersection in the conventional sedimentation apparatus serves as a part (a part to catch suspended solids) where suspended solids can stably land, suspended solids tend to accumulate and generate the deposits 55 thereon (see FIG. 19). Then, the following problems arise when the deposits 55 grow. That is, when the deposits 55 grow, an opening area of an open end on the outlet side of the flow path is reduced. When the opening area of the open end is reduced in such a manner, a flow rate of the treated water flowing out from the flow path is increased, and suspended solids are vigorously discharged together with the treated water accordingly. As a result, the treated water is contaminated by the suspended solids discharged vigorously together with the treated water, or the above-described suspended solids accumulate on an upper surface of the apparatus to cause further growth of the deposits. Thereafter, the deposits eventually grow until the open ends on the outlet sides of some of the flow paths are completely blocked. Then, when the open ends of some of the flow paths are completely blocked, an amount of raw water flowing into unblocked flow paths increases. As a result, in the conventional sedimentation apparatus, a sedimentation removal rate of the entire apparatus decreases.

As a result of intensive studies made so as to solve the problems of such conventional sedimentation apparatuses, the present inventors have found that it is possible to solve the problems by arranging the upper ridge parts of the inclined parts and those of the side plates at different heights in the sedimentation apparatuses. That is, according to the present invention, it is possible to eliminate the intersections of the side plates and the inclined parts, or reduce the number of the intersections, as compared with the conventional sedimentation apparatus. In the conventional sedimentation apparatus, since the downward flows from the four directions are flowing to gather at each intersection, suspended solids tend to accumulate at the intersection. In view of this, if the upper ridge parts of the inclined parts and the upper ridge parts of the side plates are positioned at different heights as described above, only downward flows from two flow paths arranged in a longitudinal direction of the side plate (that is, downward flows from two directions) gather as indicated by, for example, arrows in FIG. 10. Therefore, even when the suspended solids floating in the flow path in the vicinity of the outlet thereof are caught in the downward flow, the suspended solids are less likely to accumulate and generate the deposits 55 at the intersection than in the conventional sedimentation apparatus.

An inclined sedimentation acceleration apparatus of the present invention will be specifically described below.

[1] Inclined Sedimentation Acceleration Apparatus (First Invention)

Figure 1:
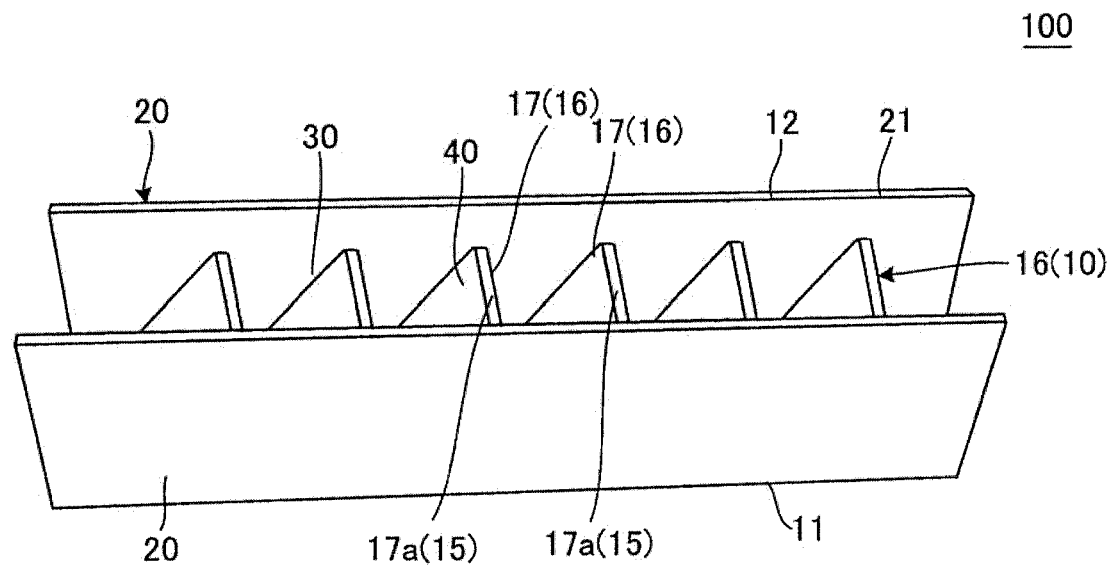
FIG. 1 is a perspective view schematically showing one embodiment of an inclined sedimentation acceleration apparatus (first invention) of the present invention.
Figure 2:
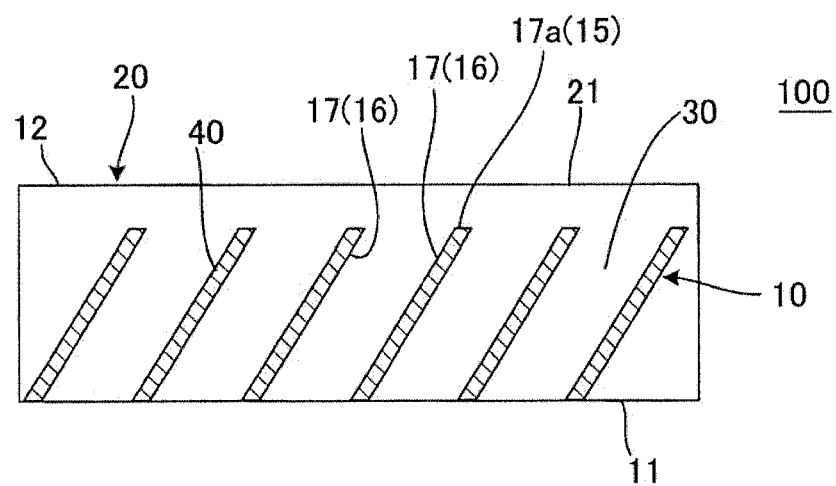
FIG. 2 is a sectional view schematically showing the one embodiment of the inclined sedimentation acceleration apparatus of the present invention, as seen from a side.
Figure 3:
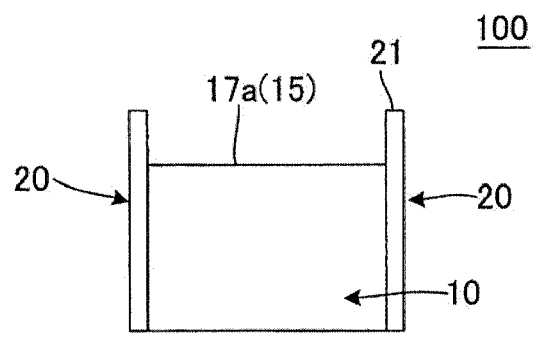
FIG. 3 is a plane view schematically showing the one embodiment of the inclined sedimentation acceleration apparatus of the present invention, as seen in a direction in which side plates extend.

FIG. 1 is a perspective view schematically showing one embodiment of the inclined sedimentation acceleration apparatus (first invention) of the present invention. FIG. 2 is a sectional view schematically showing the one embodiment of the inclined sedimentation acceleration apparatus of the present invention, as seen from a side. FIG. 3 is a plane view schematically showing the one embodiment of the inclined sedimentation acceleration apparatus of the present invention, as seen in a direction in which side plates extend.

The one embodiment of the inclined sedimentation acceleration apparatus according to the first invention is an inclined sedimentation acceleration apparatus 100 shown in FIGS. 1 to 3. The inclined sedimentation acceleration apparatus 100 includes an inclined part 10 having a plurality of inclined flow paths 30 through which raw water flows, and side plates 20 disposed on both sides of the inclined parts 10. In the inclined sedimentation acceleration apparatus 100, an upper ridge part (upper end face) 15 of the inclined part 10 is positioned lower than an upper ridge part (upper end face) 21 of the side plate 20. That is, in the inclined sedimentation acceleration apparatus 100, the upper ridge part (upper end face) 15 of the inclined part 10 and the upper ridge part (upper end face) 21 of the side plate 20 are disposed at different heights. The inclined flow path 30 is a space extending from a lower end face 11 as one end face to an upper end face 12 as the other end face, through which raw water containing suspended solids flows.

Figure 16:
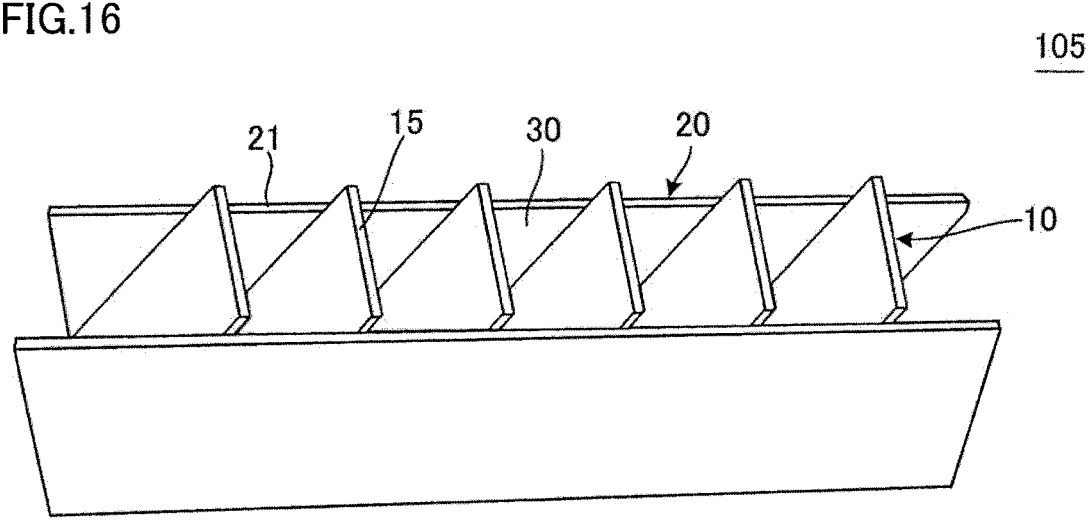
FIG. 16 is a perspective view schematically showing still further embodiment of the inclined sedimentation acceleration apparatus (first invention) of the present invention.

It should be noted that at least disposing the upper ridge part (upper end face) of the inclined part and the upper ridge part (upper end face) of the side plate at different heights is necessary for the inclined sedimentation acceleration apparatus of the present invention. Therefore, in the present invention, the upper ridge part (upper end face) 15 of the inclined part 10 may be positioned higher than the upper ridge part (upper end face) 21 of the side plate 20, as in an inclined sedimentation acceleration apparatus 105 shown in FIG. 16.

The inclined sedimentation acceleration apparatus 100 serves to solve the problem of blockage of a discharge outlet of the flow path and deterioration in removal performance, caused by excessive accumulation and growth of suspended solids on the upper end face 12. Furthermore, the inclined sedimentation acceleration apparatus 100 serves to solve the problem of deterioration in water quality due to the deposits 55 having peeled off to be mixed into treated water. In addition, according to the inclined sedimentation acceleration apparatus 100, it is possible to prevent the problem of deposits breeding chironomids, algae, and others. Moreover, according to the inclined sedimentation acceleration apparatus 100, labor for cleaning the deposits 55 can be saved or reduced.

Figure 17:
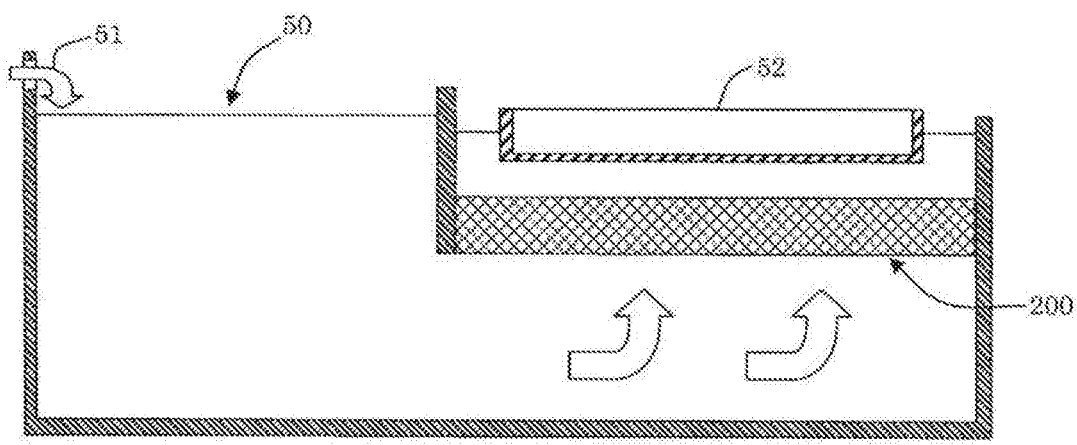
FIG. 17 is an explanatory drawing schematically showing a water treatment system including an inclined sedimentation acceleration apparatus.
Figure 18:
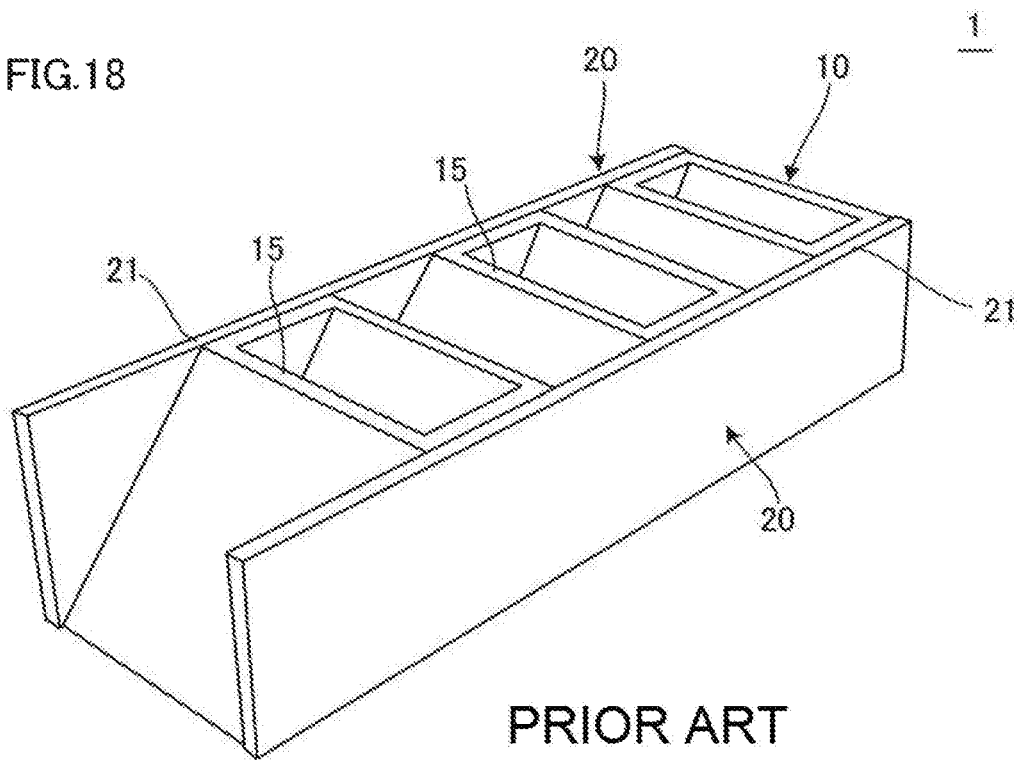
FIG. 18 is a perspective view schematically showing a conventional inclined sedimentation acceleration apparatus.

The inclined sedimentation acceleration apparatus of the present invention is installed and used in a sedimentation pond 50, as an inclined sedimentation acceleration apparatus 200 shown in FIG. 17. As shown in FIG. 17, raw water 51 is supplied to the sedimentation pond 50, enters the flow path from below the inclined sedimentation acceleration apparatus 200, and flows upward therethrough. At the time, suspended solids in the raw water are separated from the raw water while the suspended solids settle on inclined surfaces 40 (see FIGS. 1, 2 and others) of the inclined part 10. Then, the raw water, from which the suspended solids have been removed, is discharged as treated water from a water collecting trough 52 to the outside of the sedimentation pond 50.

Next, each constituent element of the inclined sedimentation acceleration apparatus of the present invention will be described.

[1-1] Inclined Part:

There is no particular limitation on the inclined part as long as the inclined part has a plurality of the inclined flow paths through which raw water flows. The inclined part may be formed of at least either of a plate-shaped inclined plate having the inclined surface or a tubular inclined pipe (rectangular cylindrical member) having the inclined surface. In the case of integrally forming the inclined part and the side plates, it is preferable that the inclined part is formed of the inclined plates. This is to facilitate manufacturing of the inclined sedimentation acceleration apparatus. Additionally, in the case where the inclined part and the side plates are separately formed and joined to produce the inclined sedimentation acceleration apparatus, it is preferable that the inclined part is formed of inclined pipes. This is because by adopting the inclined pipe, it is possible to fix (join), in a favorable manner, the inclined part and the side plates which need to be fixed to each other. In addition, this is also because the inclined pipe is excellent in strength as compared with the inclined plate.

FIGS. 1 to 3 show the inclined sedimentation acceleration apparatus 100 including the inclined part 10 formed of a plurality of (six) inclined plates 16. When, among the inclined plates 16, the inclined plate whose upper ridge part is positioned lower than the upper ridge part (upper end face 21) of the side plate 20 is defined as a "short-side inclined plate 17," all the inclined plates 16 in the inclined sedimentation acceleration apparatus 100 are the short-side inclined plates 17. An upper ridge part (upper end face 17a) of the short-side inclined plate 17 is positioned lower than the upper ridge part (upper end face 21) of the side plate 20. Since the inclined sedimentation acceleration apparatus 100 configured as described above has no intersection at the upper ridge parts, space for suspended solids (SS) to land decreases, and thus starting points of the growth of the deposits 55 decrease. Therefore, according to the inclined sedimentation acceleration apparatus 100, it is possible to prevent the deposits 55 from growing to the extent that an open end on an outlet side of the flow path is blocked. Furthermore, with the use of the inclined sedimentation acceleration apparatus 100, labor for cleaning the deposits 55 can be saved or reduced. It should be noted that the inclined plate 16 is not limited to a flat plate, and may be a plate having a horizontal section in a V shape, a polygonal shape, or the like.

Figure 4:
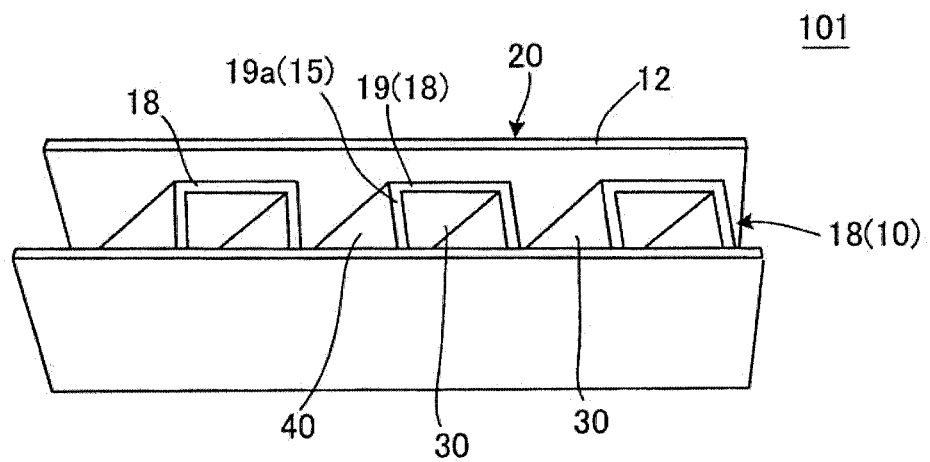
FIG. 4 is a perspective view schematically showing another embodiment of the inclined sedimentation acceleration apparatus of the present invention.

FIG. 4 shows an inclined sedimentation acceleration apparatus 101 including the inclined part 10 formed of a plurality of (three) inclined pipes 18. When, among the inclined pipes 18, the inclined pipe whose upper ridge part is positioned lower than the upper ridge part (upper end face 21) of the side plate 20 is defined as a "short-side inclined pipe 19," all the inclined pipes 18 in the inclined sedimentation acceleration apparatus 101 are the short-side inclined pipes 19. An upper ridge part (upper end face 19a) of the short-side inclined pipe 19 is positioned lower than the upper ridge part (upper end face 21) of the side plate 20. The inclined sedimentation acceleration apparatus 101 configured as described above achieves an effect similar to that of the above-described inclined sedimentation acceleration apparatus 100.

An outer peripheral shape of the inclined pipe 18 is not particularly limited. Examples of the outer peripheral shape thereof include a quadrangular prism shape as shown in FIG. 4 and others, a pillar shape having a rhombic cross section orthogonal to a direction in which the inclined pipe extends, a pillar shape having a chevron-shaped (inverted V-shaped) cross section orthogonal to the direction in which the inclined pipe extends, and a hexagonal prism shape.

The number of the inclined plates and that of the inclined pipes are not particularly limited, and can be appropriately set. In addition, the number of the "short-side inclined plates" and that of the "short-side inclined pipes" are also not particularly limited, and can be appropriately set.

Figure 11:
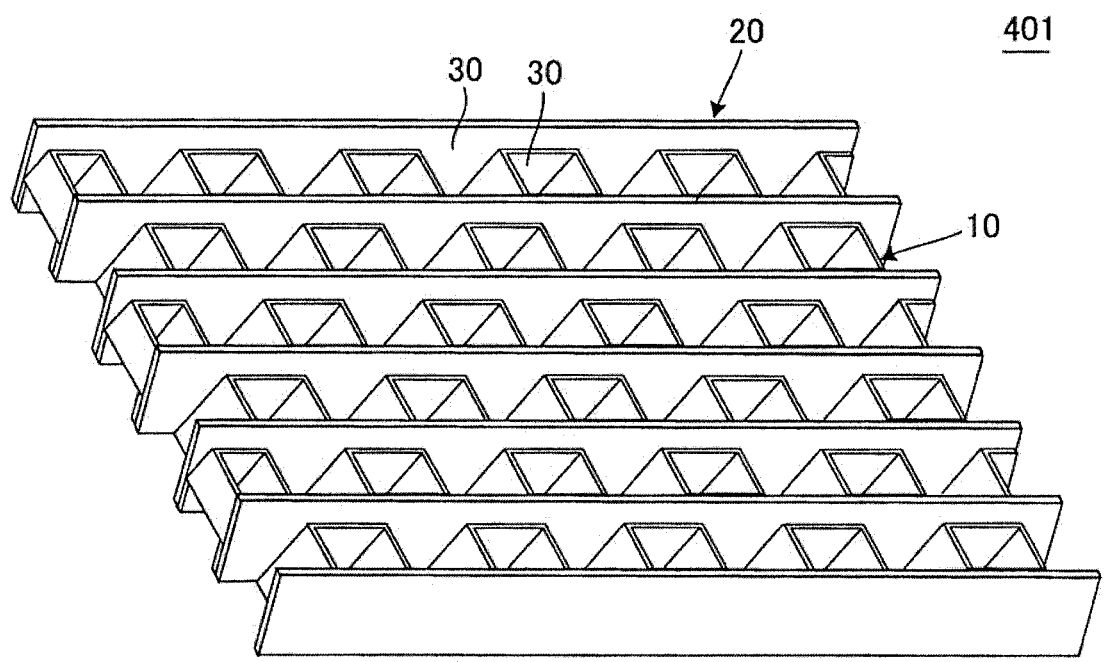
FIG. 11 is a perspective view schematically showing yet another embodiment of the inclined sedimentation acceleration apparatus of the present invention.
Figure 12:
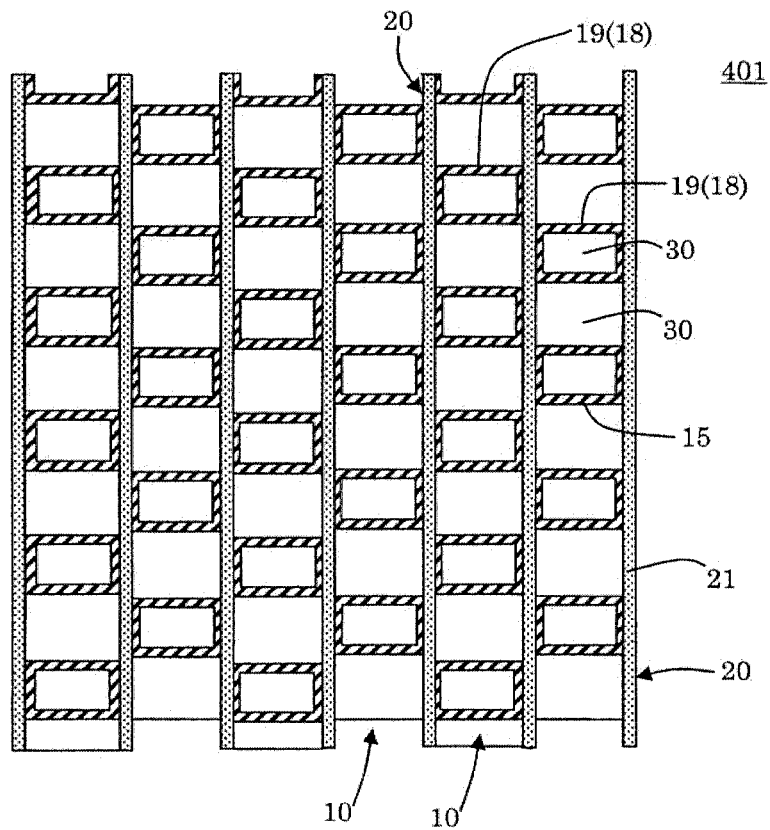
FIG. 12 is a plane view schematically showing the yet another embodiment (the embodiment shown in FIG. 11) of the inclined sedimentation acceleration apparatus of the present invention, as seen from an upper ridge part side.

It is preferable that a plurality of the inclined sedimentation acceleration apparatuses of the present invention is arranged in parallel according to a size of the sedimentation pond 50. As such an apparatus, there can be mentioned an inclined sedimentation acceleration apparatus having any of the characteristics shown in FIGS. 1 to 4 as described thus far. For example, an inclined sedimentation acceleration apparatus 401 shown in FIGS. 11 and 12 is an example of including a plurality of the inclined parts 10 arranged in parallel. As in the example, the inclined sedimentation acceleration apparatus of the present invention may have one side plate located between the adjacent inclined parts.

It should be noted that the phrase "arranged in parallel" means being arranged adjacent to each other in a direction perpendicular to a flow direction of raw water heading from an upstream side to a downstream side of the sedimentation pond 50.

Furthermore, it is preferable that as shown in FIGS. 11 and 12, the inclined sedimentation acceleration apparatus of the present invention is configured as follows. The upper ridge parts 15 of all the inclined parts 10 are positioned lower than the upper ridge parts 21 of the side plates 20. In addition, the inclined pipes 18 (short-side inclined pipes 19) of the adjacent inclined parts 10 having the side plate 20 interposed therebetween are alternately arranged in a longitudinal direction of the side plate 20. Since the inclined pipes 18 of the adjacent inclined parts 10 having the side plate 20 interposed therebetween are alternately arranged in the longitudinal direction of the side plate 20 as shown in FIGS. 11 and 12, the inclined sedimentation acceleration apparatus 401 configured as described above achieves excellent strength.

The phrase "the inclined pipes of the adjacent inclined parts having the side plate interposed therebetween are alternately arranged in the longitudinal direction of the side plate" means that the inclined pipes are arranged as follows. That is, assume that one inclined part and another inclined part adjacent thereto are each formed of a plurality of inclined pipes arranged in the flow direction of raw water, and the inclined sedimentation acceleration apparatus is seen through from the side plate side. Then, it means that the inclined pipes forming the another inclined part adjacent to the one inclined part are disposed between the inclined pipes forming the one inclined part.

Figure 5:
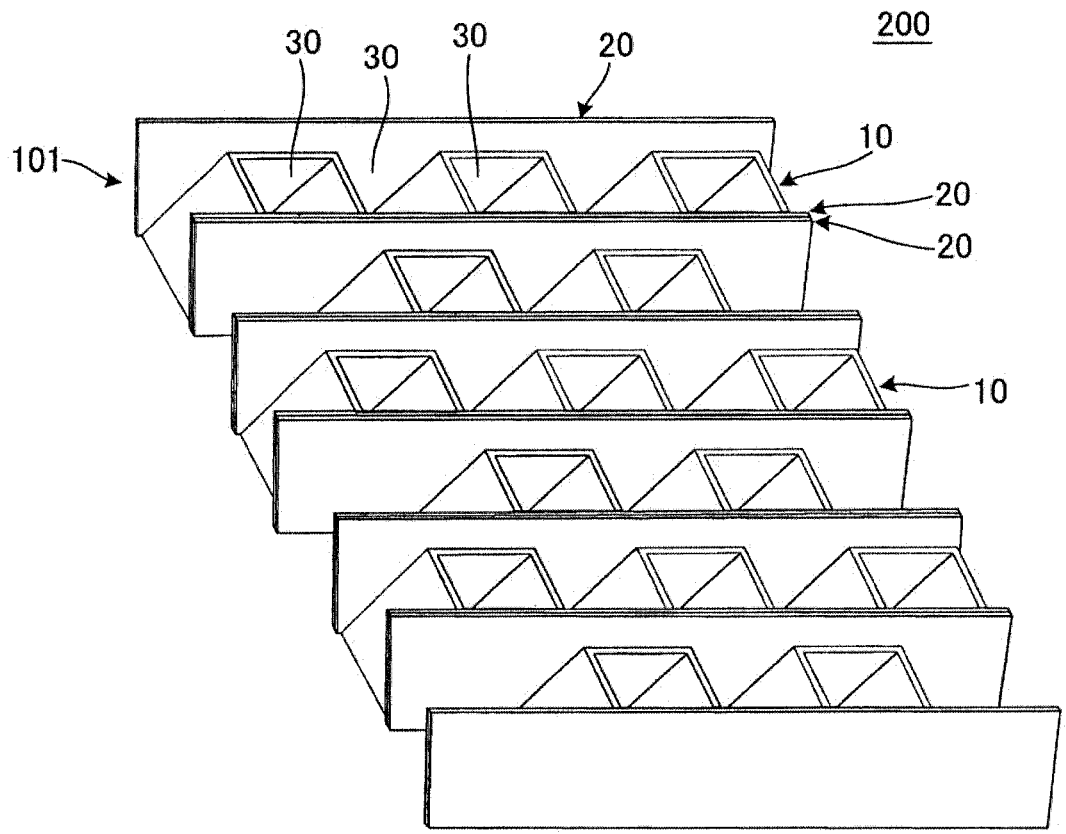
FIG. 5 is a perspective view schematically showing still another embodiment of the inclined sedimentation acceleration apparatus of the present invention.

It should be noted that assuming that the inclined sedimentation acceleration apparatus 101 shown in FIG. 4 is a single unit, it is possible to say that the inclined sedimentation acceleration apparatus 401 includes a plurality of the units arranged in parallel. Here, the inclined sedimentation acceleration apparatus 401 is configured by fixation of the adjacent inclined sedimentation acceleration apparatuses 101 with the side plate 20 interposed therebetween as a common side plate. In other words, the one side plate 20 is provided between the inclined parts 10 of the adjacent inclined sedimentation acceleration apparatuses 101. The inclined sedimentation acceleration apparatus 401 shown in FIGS. 11 and 12 can be mentioned as an example of such an inclined sedimentation acceleration apparatus including a plurality of inclined parts arranged in parallel with a single side plate interposed therebetween. It should be noted that, in the present invention, it is possible to configure an apparatus by simply connecting the inclined sedimentation acceleration apparatuses 101 with two side plates 20 interposed therebetween, as shown in FIG. 5.

Figure 6:
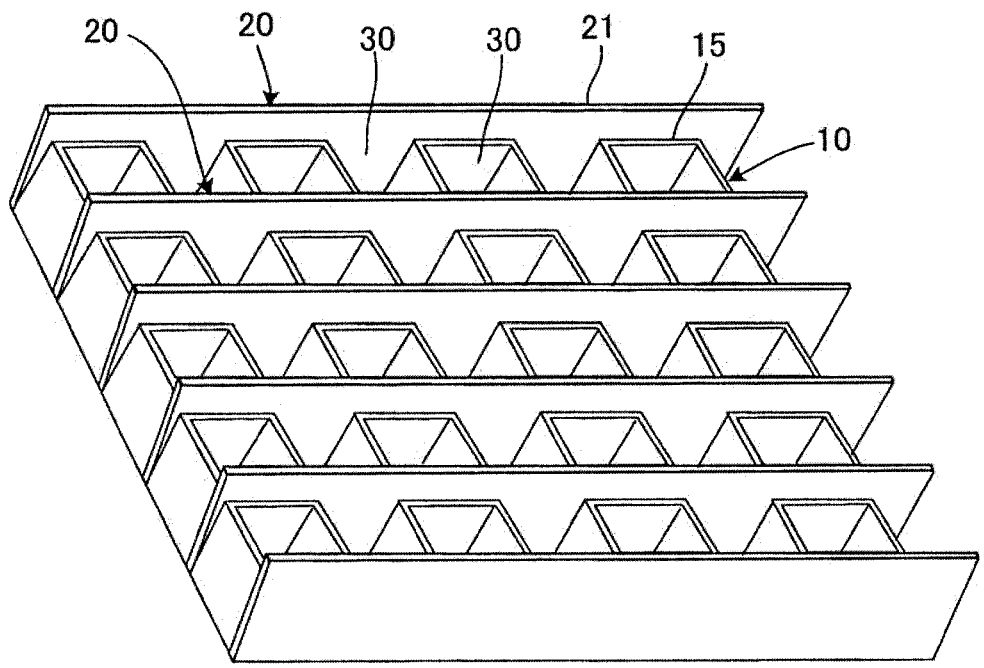
FIG. 6 is a perspective view schematically showing yet another embodiment of the inclined sedimentation acceleration apparatus of the present invention.

In an inclined sedimentation acceleration apparatus 201 shown in FIG. 6, the inclined pipes 18 (inclined parts 10) provided on both sides of the one side plate 20 are disposed at the same positions on a line orthogonal to the side plate 20. Excluding this point, the configuration of the inclined sedimentation acceleration apparatus 201 is the same as that of the inclined sedimentation acceleration apparatus 401. The inclined sedimentation acceleration apparatus 201 configured as described above achieves an effect similar to those of the above-described inclined sedimentation acceleration apparatuses 100 and 101.

It should be noted that polyethylene terephthalate (PET), polyvinyl chloride (PVC), stainless steel (SUS), or the like can be adopted as materials of the inclined plate and the inclined pipe.

[1-2] Side Plate:

The side plates 20 are disposed on both sides of the inclined part 10. Specifically, the side plates 20 are tabular members disposed in a manner to sandwich the inclined part 10. It is possible to select from among conventionally known ones, and use an appropriate one as the side plate 20. The side plate 20 is fixed to the inclined part 10 by adhesion or the like, or is integrally molded with the inclined part 10, so as to serve to support the inclined part 10.

[2] Inclined Sedimentation Acceleration Apparatus (Second Invention)

Figure 7:
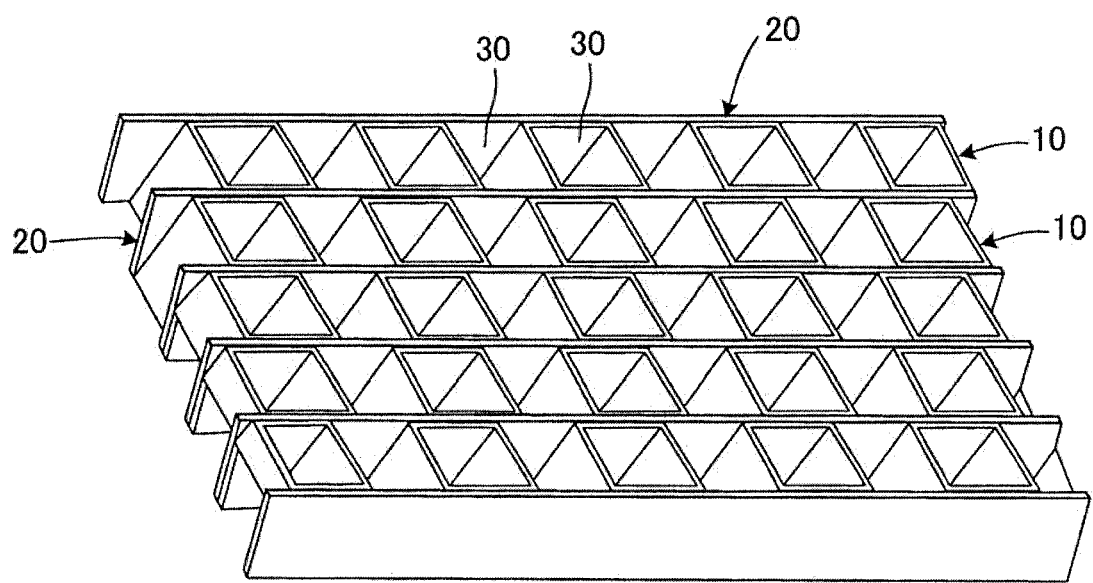
FIG. 7 is a perspective view schematically showing one embodiment of an inclined sedimentation acceleration apparatus (second invention) of the present invention.
Figure 8:
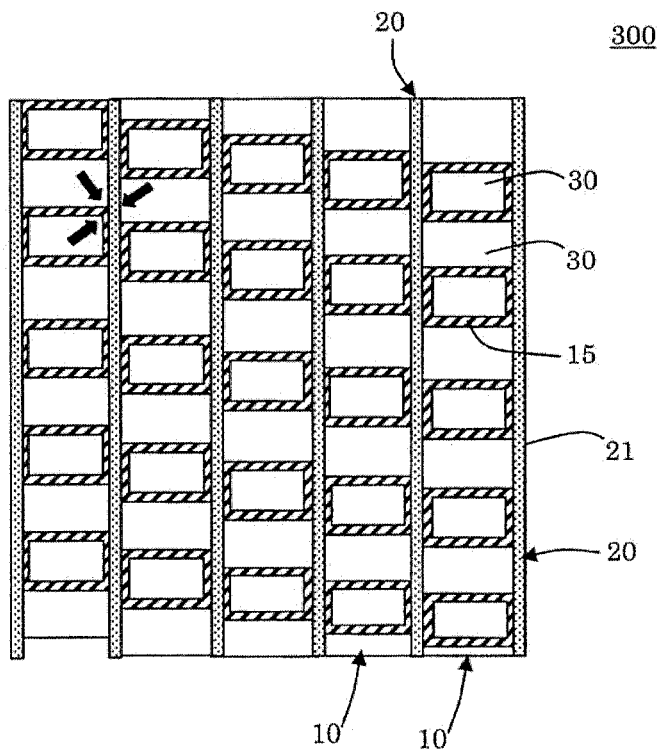
FIG. 8 is a plane view schematically showing the one embodiment of the inclined sedimentation acceleration apparatus (second invention) of the present invention, as seen from an upper ridge part side.

One embodiment of an inclined sedimentation acceleration apparatus according to a second invention is an inclined sedimentation acceleration apparatus 300 shown in FIGS. 7 and 8. The inclined sedimentation acceleration apparatus 300 includes a plurality of inclined parts 10 arranged in parallel, and side plates 20 disposed on both sides of the respective inclined parts 10. The inclined part 10 has a plurality of inclined flow paths 30 through which raw water flows. The adjacent inclined parts 10 having the side plate 20 interposed therebetween are arranged in a manner to be displaced from each other along a longitudinal direction of the side plate 20.

In the inclined sedimentation acceleration apparatus 300, upper end faces of the side plates 20 and upper end faces of the inclined parts 10 are positioned on the same plane. However, the side plates 20 and the inclined parts 10 do not intersect in a cross shape. Specifically, the side plates 20 and the inclined parts 10 intersect to form T-intersections. Therefore, it is difficult for SS to accumulate and generate deposits 55 at the intersections (see FIG. 19 and others). In other words, the intersection of the side plate 20 and the inclined part 10 is not surrounded by four flow paths. Specifically, as indicated by arrows in FIG. 8, the intersection is surrounded by three flow paths (one less than the four flow paths). In the inclined sedimentation acceleration apparatus 300 configured as described above, while an area of the intersection increases as compared with the above-described inclined sedimentation acceleration apparatus 100, the area of the intersection is reduced as compared with the conventional sedimentation apparatus. Therefore, similarly to the inclined sedimentation acceleration apparatus of the first invention, even when suspended solids floating in the flow path in the vicinity of an outlet thereof are caught in a downward flow of treated water, the suspended solids are less likely to be caught at the intersection. As a result, suspended solids are prevented from excessively accumulating to generate the deposits 55 at the intersection. Thus, there is achieved an effect substantially similar to that of the inclined sedimentation acceleration apparatus 100.

It should be noted that for constituent elements common between the inclined sedimentation acceleration apparatuses according to the first invention and the second invention, it is possible to appropriately adopt the corresponding constituent elements of the inclined sedimentation acceleration apparatus according to the first invention as the constituent elements of the inclined sedimentation acceleration apparatus according to the second invention. For example, the inclined part 10 of the inclined sedimentation acceleration apparatus 300 shown in FIG. 7 is formed of rectangular cylindrical members. However, the inclined part 10 may be formed of inclined plates as shown in FIG. 1.

Sizes (dimensions) of the inclined sedimentation acceleration apparatuses of the present invention (first and second inventions) are not particularly limited, and the size (dimension) of a conventionally known inclined sedimentation acceleration apparatus can be appropriately adopted.

[3] Still Another Embodiment

Figure 9:
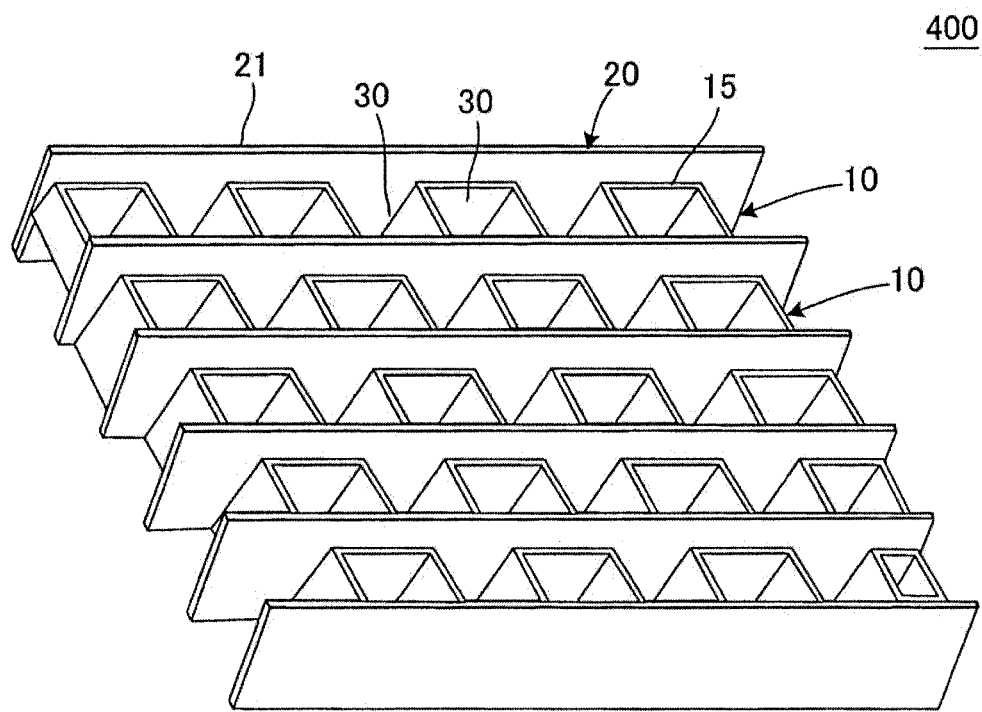
FIG. 9 is a perspective view schematically showing still another embodiment of the inclined sedimentation acceleration apparatus of the present invention.
Figure 10:
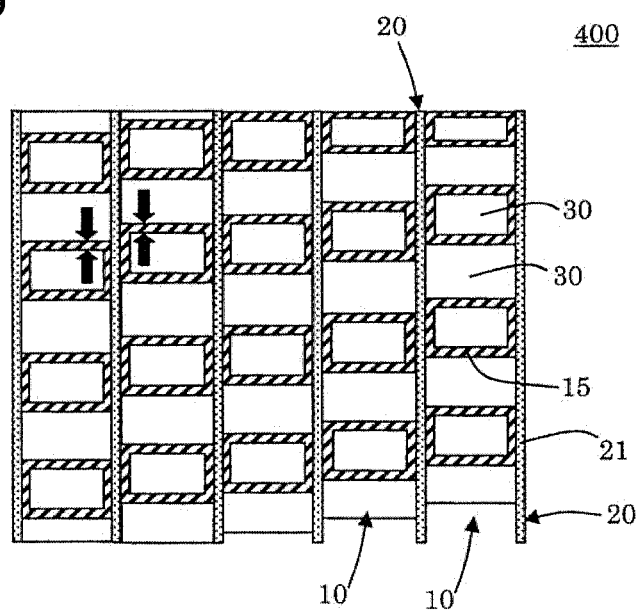
FIG. 10 is a plane view schematically showing the still another embodiment (the embodiment shown in FIG. 9) of the inclined sedimentation acceleration apparatus of the present invention, as seen from an upper ridge part side.

An inclined sedimentation acceleration apparatus 400 shown in FIGS. 9 and 10 is a combination of the characteristics of the above-described first and second inventions. That is, the inclined sedimentation acceleration apparatus 400 includes a plurality of inclined parts 10 arranged in parallel, and side plates 20 disposed on both sides of the respective inclined parts 10. The inclined part 10 has a plurality of inclined flow paths 30 through which raw water flows. In addition, the inclined sedimentation acceleration apparatus 400 is configured as follows. Upper ridge parts 15 of all the inclined parts 10 are positioned lower than upper ridge parts 21 of the side plates 20. In addition, the adjacent inclined parts 10 having the side plate 20 interposed therebetween are arranged in a manner to be displaced from each other along a longitudinal direction of the side plate 20. The inclined sedimentation acceleration apparatus 400 configured as described above also achieves the effect of the above-described inclined sedimentation acceleration apparatus 300 in addition to the effect of the above-described inclined sedimentation acceleration apparatus 100.

Figure 13:
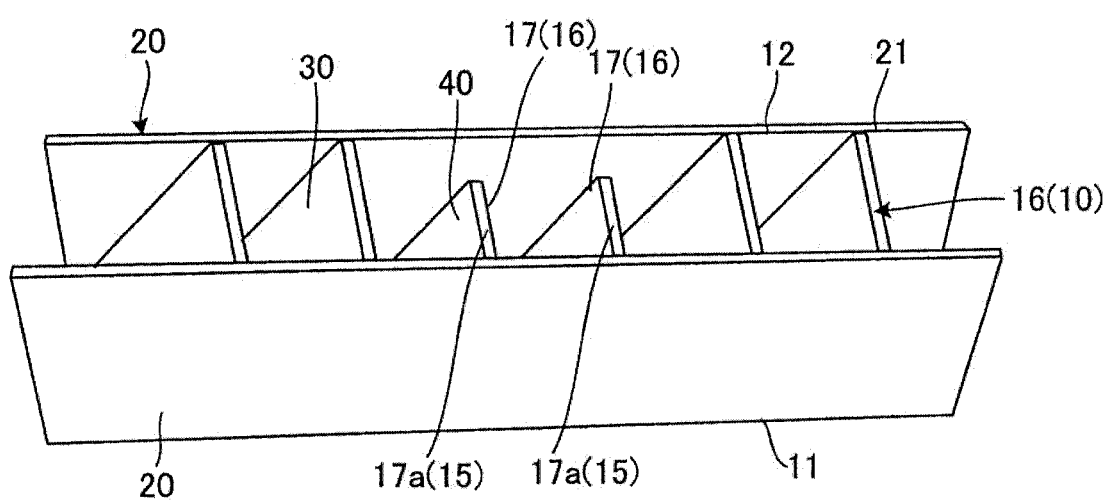
FIG. 13 is a perspective view schematically showing still another embodiment of the inclined sedimentation acceleration apparatus (first invention) of the present invention.

FIG. 13 shows an inclined sedimentation acceleration apparatus 102 including the inclined part 10 formed of a plurality of (six) inclined plates 16. The six inclined plates 16 include two short-side inclined plates 17 disposed at the center. An upper ridge part (upper end face 17*a*) of the short-side inclined plate 17 is positioned lower than the upper ridge part (upper end face 21) of the side plate 20.

Figure 14:
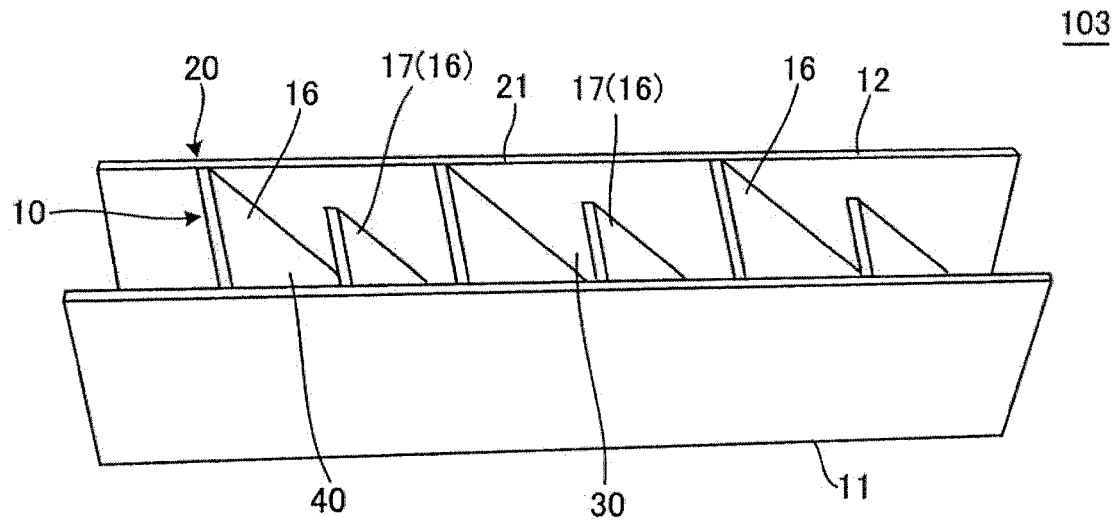
FIG. 14 is a perspective view schematically showing yet another embodiment of the inclined sedimentation acceleration apparatus (first invention) of the present invention.

FIG. 14 shows an inclined sedimentation acceleration apparatus 103 including the inclined part 10 formed of a plurality of the (five) inclined plates 16. The inclined sedimentation acceleration apparatus 103 includes the short-side inclined plates 17 and the normal inclined plates 16 other than the short-side inclined plates 17, which are alternately arranged.

Figure 15:
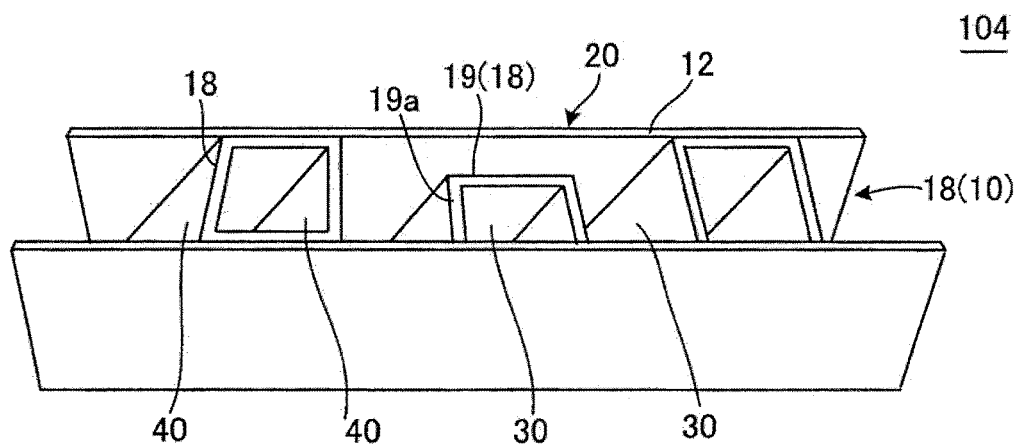
FIG. 15 is a perspective view schematically showing further embodiment of the inclined sedimentation acceleration apparatus (first invention) of the present invention.

FIG. 15 shows an inclined sedimentation acceleration apparatus 104 including the inclined part 10 formed of a plurality of (three) inclined pipes 18. The three inclined pipes 18 include one short-side inclined pipe 19 disposed at the center. An upper ridge part (upper end face 19*a*) of the short-side inclined pipe 19 is positioned lower than the upper ridge part (upper end face 21) of the side plate 20.

As shown in FIGS. 13 to 15, it is also within the scope of the present invention that the upper ridge parts of at least a part of the inclined part (some of the inclined plates or inclined pipes) are positioned lower than the upper ridge parts of the side plates. With such configurations of the inclined parts in the inclined sedimentation acceleration apparatuses 102, 103, and 104, while an area of the intersection increases as compared with the above-described inclined sedimentation acceleration apparatus 100, the area of the intersection is reduced as compared with the conventional apparatus. Therefore, the inclined sedimentation acceleration apparatuses 102, 103, and 104 can achieve an effect similar to that described above.

[4] Manufacturing Method

A method of manufacturing the inclined sedimentation acceleration apparatuses of the present invention (first and second inventions) is not particularly limited, and a method of manufacturing a conventionally known inclined acceleration apparatus can be adopted as appropriate. Specifically, the inclined sedimentation acceleration apparatuses of the present invention can be manufactured while an inclined part is formed by injection molding, extrusion, or the like, and then fixed to tabular side plates with a bonding agent or the like. As another method, there can be mentioned a method of integrally molding the side plates and the inclined part by techniques such as injection molding and extrusion.

INDUSTRIAL APPLICABILITY

The inclined sedimentation acceleration apparatuses of the present invention can be used as a sedimentation apparatus to be installed in a sedimentation pond.

DESCRIPTION OF REFERENCE NUMERALS

1, 2: sedimentation apparatus, 10: inclined part, 11: lower end face, 12: upper end face, 15: upper ridge part of inclined part (upper end face of inclined part), 16: inclined plate, 17: short-side inclined plate, 17*a*: upper end face of short-side inclined plate, 18: inclined pipe, 19: short-side inclined pipe, 19*a*: end face (upper end face) of short-side inclined pipe, 20: side plate, 21: upper ridge part of side plate (upper end face of side plate), 30: inclined flow path, 40: inclined surface, 50: sedimentation pond, 51, 151: raw water, 52: water collecting trough, 55: deposits, 100, 101, 102, 103, 104, 105, 200, 201, 300, 400, 401: inclined sedimentation acceleration apparatus, and X: downward flow.

The invention claimed is:

1. An inclined sedimentation acceleration system comprising:
a reservoir configured to store raw water,
an inclined sedimentation acceleration apparatus configured to precipitate suspended solids contained in the raw water, the inclined sedimentation acceleration apparatus being submerged inside the reservoir, and
a water trough configured to collect water flowing through the inclined sedimentation acceleration apparatus and to discharge the water to the outside of the reservoir, the water trough being disposed above the inclined sedimentation acceleration apparatus,
wherein the inclined sedimentation acceleration apparatus comprises;
an inclined part having a plurality of inclined flow paths through which raw water flows upward; and
side plates extending in a longitudinal direction disposed on both sides of the inclined part,
wherein all of an upper ridge part of the inclined part is disposed at a height different from that of an upper ridge part of the side plate,
the upper ridge part of the inclined part and the upper ridge part of the side plate are positioned beneath the water surface, and
the water trough is disposed at a position higher than the upper ridge part of the inclined part and the upper ridge part of the side plate.

2. The inclined sedimentation acceleration system according to claim 1, wherein the upper ridge part of the inclined part is disposed at a position lower than that of the upper ridge part of the side plate.

3. The inclined sedimentation acceleration system according to claim 2, wherein the inclined part is formed of an inclined plate or a rectangular cylindrical member.

4. The inclined sedimentation acceleration system according to claim 2, comprising:
a plurality of the inclined parts arranged in parallel to each other along a line orthogonal to the longitudinal direction of the side plate,
wherein the adjacent inclined parts having the side plate interposed therebetween are arranged in a manner to be displaced from each other along the line orthogonal to the longitudinal direction of the side plate.

5. The inclined sedimentation acceleration system according to claim 1, wherein the inclined part is formed of an inclined plate or a rectangular cylindrical member.

6. The inclined sedimentation acceleration system according to claim 1, comprising:
a plurality of the inclined parts arranged in parallel to each other along a line orthogonal to the longitudinal direction of the side plate,
wherein the adjacent inclined parts having the side plate interposed therebetween are arranged in a manner to be displaced from each other along the line orthogonal to the longitudinal direction of the side plate.

7. The inclined sedimentation acceleration system according to claim 1, wherein the inclined sedimentation acceleration system does not have a supporting member supporting the upper ridge part of the side plate.

8. An inclined sedimentation acceleration system comprising:
a reservoir configured to store raw water,
an inclined sedimentation acceleration apparatus configured to precipitate suspended solids contained in the raw water, the inclined sedimentation acceleration apparatus being submerged inside the reservoir, and
a water trough configured to collect water flowing through the inclined sedimentation acceleration apparatus and to discharge the water to the outside of the reservoir, the water trough being installed above the inclined sedimentation acceleration apparatus,
wherein the inclined sedimentation acceleration apparatus comprises;
an inclined part having a plurality of inclined flow paths through which raw water flows upward, and
side plates extending in a longitudinal direction disposed on both sides of the inclined part,
wherein a first inclined flow path of the inclined flow paths includes a first portion,
a second inclined flow path of the inclined flow paths adjacent to the first inclined flow path of the inclined flow paths includes a second portion adjacent to the first portion,
the inclined sedimentation acceleration apparatus has no intersection that extends along a common plane in a horizontal direction at a contact portion between the first portion and the side plate, and the inclined sedimentation acceleration apparatus has no intersection that extends along a common plane in a horizontal direction at a contact portion between the second portion and the side plate,
an upper ridge part of the inclined part and an upper ridge part of the side plate are positioned beneath the water surface, and
a collecting part of the water trough is disposed at a position higher than the upper ridge part of the inclined part and the upper ridge part of the side plate.

9. The inclined sedimentation acceleration system according to claim 8, wherein the upper ridge part of the inclined part is disposed at a position lower than that of the upper ridge part of the side plate.

10. The inclined sedimentation acceleration system according to claim 8, wherein the inclined part is formed of an inclined plate or a rectangular cylindrical member.

11. The inclined sedimentation acceleration system according to claim 8, comprising:
a plurality of the inclined parts arranged in parallel to each other along a line orthogonal to the longitudinal direction of the side plate,
wherein the adjacent inclined parts having the side plate interposed therebetween are arranged in a manner to be displaced from each other along the line orthogonal to the longitudinal direction of the side plate.

12. The inclined sedimentation acceleration system according to claim 8, wherein the inclined sedimentation acceleration system does not have a supporting member supporting the upper ridge part of the side plate.

13. An inclined sedimentation acceleration system comprising:
a reservoir configured to store raw water,
an inclined sedimentation acceleration apparatus configured to precipitate suspended solids contained in the raw water, the inclined sedimentation acceleration apparatus being submerged inside the reservoir, and
a water trough configured to collect water flowing through the inclined sedimentation acceleration apparatus and to discharge the water to the outside of the reservoir, the water trough being installed above the inclined sedimentation acceleration apparatus, wherein the inclined sedimentation acceleration apparatus comprises;

a plurality of planar plates, which extend in a longitudinal direction, having first and second sides, and an inclined part having a plurality of inclined flow paths through which raw water flows upward, the inclined flow paths being arranged in a row along the longitudinal direction of the plates, wherein a plurality of inclined parts are arranged in a row along the longitudinal direction of a first plate and a second plate between a first side of the first plate and a first side of the second plate, and upper ridge parts of the inclined parts contacting the first plate and the second plate are disposed at a height different from that of upper ridge parts of the first plate and the second plate, a plurality of inclined parts are arranged in a row along the longitudinal direction of the second plate and a third plate between a second side of the second plate and a first side of the third plate, and upper ridge parts of the inclined parts contacting the second plate and the third plate are disposed at a height different from that of upper ridge parts of the second plate and the third plate, the upper ridge parts of the inclined parts and the upper ridge parts of the first, the second and the third plates are positioned beneath the water surface, and the water trough is disposed at a position higher than the upper ridge parts of the first, the second and the third plates and the upper ridge parts of the inclined parts.

14. The inclined sedimentation acceleration system according to claim 13, wherein the upper ridge parts of the inclined parts are disposed at a position lower than that of the upper ridge parts of the first, the second and the third plates.

15. The inclined sedimentation acceleration system according to claim 13, wherein the inclined parts are formed of inclined plates or rectangular cylindrical members.

16. The inclined sedimentation acceleration system according to claim 13, comprising:

a plurality of the inclined parts arranged in parallel to each other along a line orthogonal to the longitudinal direction of the first, the second and the third plates, wherein the adjacent inclined parts having the first, the second and the third plates interposed therebetween are arranged in a manner to be displaced from each other along the line orthogonal to the longitudinal direction of the first, the second and the third plates.

17. The inclined sedimentation acceleration system according to claim 13, wherein the inclined sedimentation acceleration system does not have a supporting member supporting the upper ridge parts of the first, the second and the third plates.

* * * * *